United States Patent [19]

Scipione

[11] Patent Number: 4,621,356
[45] Date of Patent: Nov. 4, 1986

[54] COMMUNICATIONS INTERFACE FOR DUPLEX TRANSMISSION AND RECEPTION OF DATA AND OTHER SIGNALS OVER TELEPHONE LINES

[76] Inventor: Fred J. Scipione, 1537 Norton St., Rochester, N.Y. 14621

[21] Appl. No.: 514,426

[22] Filed: Jul. 18, 1983

[51] Int. Cl.[4] .................. H04B 3/20; H04B 3/24; H04J 15/00; H04L 5/14
[52] U.S. Cl. .................................. 379/98; 370/27; 370/32.1; 379/410
[58] Field of Search ............... 370/24, 27, 32; 179/170.2, 170.6; 364/728, 819, 824

[56] References Cited

U.S. PATENT DOCUMENTS

| | | | |
|---|---|---|---|
| 3,632,905 | 1/1972 | Thomas et al. | 179/170.2 |
| 3,735,055 | 5/1973 | Thomas | 179/170.2 |
| 4,246,582 | 1/1981 | Kondo et al. | 370/32 |
| 4,320,498 | 3/1982 | Justice | 370/32 |
| 4,349,889 | 9/1982 | Van den Elzen | 179/170.2 |
| 4,362,909 | 12/1982 | Snijders et al. | 179/170.2 |
| 4,370,741 | 1/1983 | Haass | 370/24 |
| 4,423,505 | 12/1983 | Grieg | 370/32 |
| 4,480,327 | 10/1984 | Vance | 370/27 |
| 4,481,622 | 11/1984 | Cheng et al. | 370/32 |

OTHER PUBLICATIONS

Demyto et al.-"Echo Cancellation"-Proceedings of IEEE-vol. 65, No. 3, Mar. 1977, pp. 444-453.

*Primary Examiner*—Joseph A. Orsino, Jr.
*Attorney, Agent, or Firm*—Martin LuKacher

[57] ABSTRACT

A communication system for simultaneous (full duplex) transmission and reception over a communications link, such as a telephone line, utilizes a duplexer to derive the received signal and decorrelates the received and transmitted signals with the aid of a correlation cancellation loop thereby reducing the effect of the transmitted signal on the received signal without the need for frequency selective filters thereby making efficient use of the available telephone line band width, increasing the available rate of transmission and reception of the signals and reducing the need for equalized (conditioned) telephone lines for high-speed transmission and reception. A variable gain (AGC) amplifier which provides a substantially constant amplitude output may be used in the correlation cancellation loop to amplify the received signals for correlation with the transmitted signals so as to enhance operation with received signals derived at low amplitude from the line. A portion of the transmitted signal may be also injected into the loop to enhance the decorrelation effect.

19 Claims, 4 Drawing Figures

COMMUNICATIONS INTERFACE FOR DUPLEX TRANSMISSION AND RECEPTION OF DATA AND OTHER SIGNALS OVER TELEPHONE LINES

DESCRIPTION

The present invention relates to communication systems, and particularly to systems for the simultaneous transmission and reception, on a full duplex basis, of signals over communication links.

The invention is especially suitable for the transmission and reception of digital signals which are translated into and from tone signals adapted to be transmitted over telephone lines (e.g., frequency shift keyed (FSK) or phase shift keyed (PSK) tones) with the aid of modems. The system provided by the invention is also applicable to and makes possible the transmission and reception of digital signals and analog signals, such as audio and voice, over communications links, such as telephone lines.

A limitation on the rate and type of signals (e.g., tones and pulse signals) which can be transmitted over communication links, particularly the telephone lines of the public telephone system, is the requirement to separate the transmitted signal from the received signal. Conventionally, band pass and other selective filters are used so as to separate the received signals from the transmitted signals, which signals occupy different portions of the band width of the communications link. For bi-directional, full duplex transmission, the transmitted signals occupy a band portion, usually smaller, than the received signals so as to enable the reception at higher rates than transmission. In any event, the band width is split between sending (transmission) and receiving which reduces the rate of communication of information in either band. Because selective filters do not have infinitely sharp skirts, a portion of the band width of the communications link is lost, thereby reducing the available band width and the transmission speed. Furthermore, filters do not have an absolutely uniform response characteristic and introduce distortion which also has the effect of limiting the speed of communication over the link. In any event, the signals which overlap in frequency cannot be simultaneously transmitted and received without distortion. The cost of equipment for interfacing with the communications link to enable high speed transmission and reception is also increased because of the need for complex filters having high selectivity and low distortion characteristics. High speed transmission has oftentimes relied on the need for equalized or conditioned lines which have a larger available band width than ordinary unconditioned lines of the public telephone system. Such lines are needed in many cases because of the limited selectivity of and the distortion introduced by the selective filters.

Accordingly, it is the principal object of the present invention to provide an improved communication system for simultaneous transmission and reception (full duplex) over a communication link, such as a telephone line, without the need for frequency selective filters to segregate the transmitted and received signals.

It is another object of the present invention to provide an improved communication system which provides for high speed transmission and reception of data signals over communication links such as telephone lines.

It is a further object of the present invention to provide an improved communication system which makes efficient use of the band width of a communication link for the transmission of digital and other signals.

It is a still further object of the present invention to provide an improved interface system for use with communication links such as telephone lines which reduces the need for equalization of the lines so as to enable transmission and reception of data and other signals at high rates.

It is a still further object of the present invention to provide an improved interface for use with telephone lines which reduces the noise-like effect of the transmitted signal on signals received from the line, thereby reducing the need for a conditioned line for the transmission and reception of data and other signals at high rates.

It is a still further object of the present invention to provide an improved communication system which accommodates the transmission and reception of signals having different modulation characteristics (e.g., FSK and PSK), without modification.

It is a still further object of the present invention to provide an improved communication system which enables several sources of signals of different types to be selected for transmission and reception over a communication link, such as a telephone line.

Briefly described, a communication system in accordance with the invention provides for simultaneous transmission and reception of information representing signals on a communications link. The system makes use of means connected to the link for separating signals received from the link from signals being transmitted on the link to provide received signals containing the transmitted signals. Means are provided for decorrelating the received signals with the transmitted signals thereby deriving output received signals which are substantially free of interference from the transmitted signals. The information represented by the output received signals can be derived by the use of demodulators such as contained in conventional modems.

The system has the advantages being self-adjusting for line conditions. No filters are needed and the communications are not restricted to a fixed frequency range in either direction over the line. The absence of frequency selective circuits (filters) avoids signal distortion inherent in such circuits. The transmitted and received signals can also overlap in frequency.

The foregoing and other objects, features and advantages of the invention, and a presently preferred embodiment thereof, will become more apparent from a reading of the following description in connection with the accompanying drawings in which.

Figure 1:
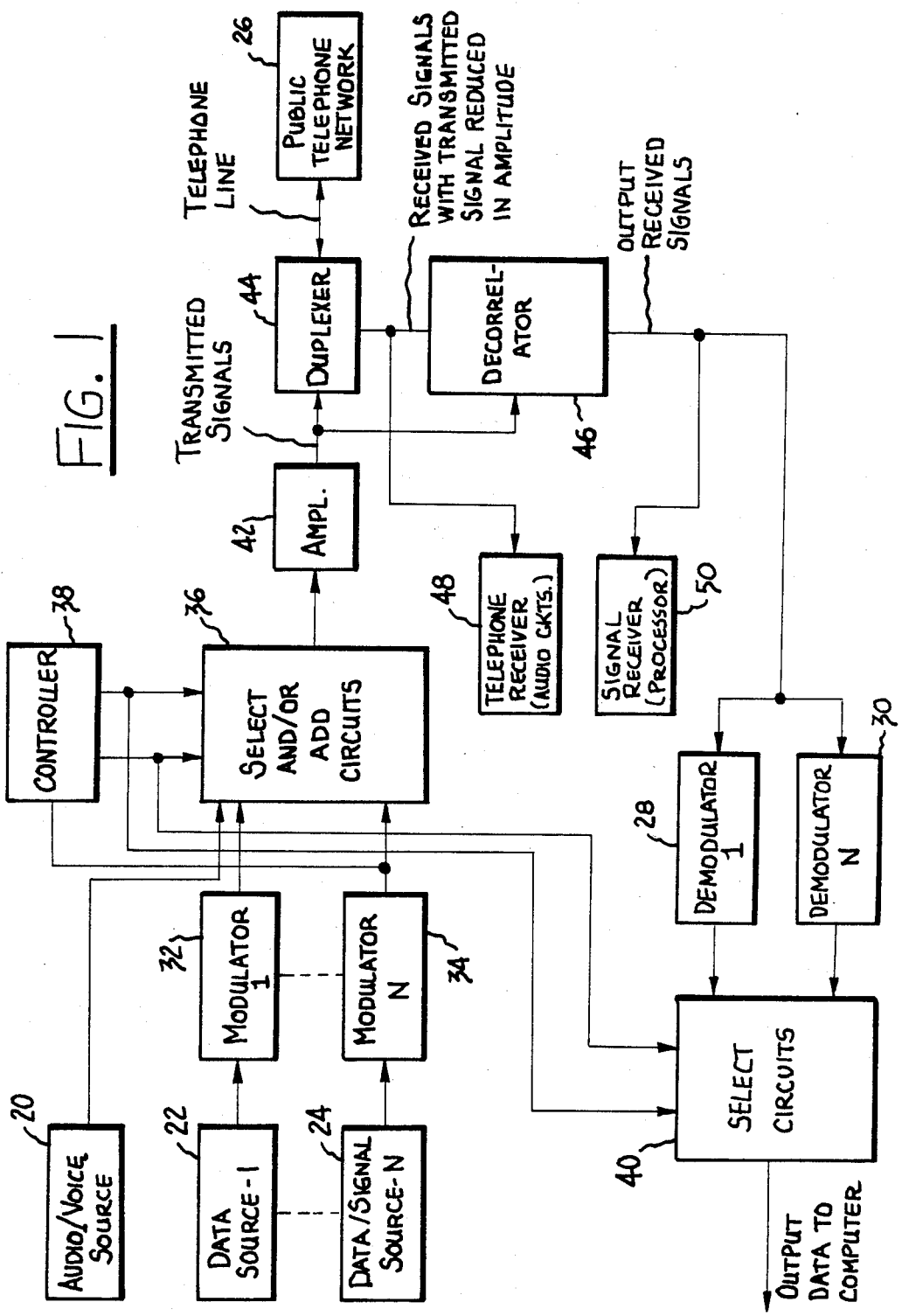
FIG. 1 is a block diagram of a communication system embodying the invention.

Referring to FIG. 1, there is shown a plurality of signal sources 20, 22, and 24, signals from which may be desired to be transmitted over a telephone line, which may be connected to the public telephone network 26, to a receiving point which may be connected to a system such as illustrated in FIG. 1 or any other system adapted to receive and transmit signals over a telephone line which are compatible with demodulators 28 and 30 of the system shown in FIG. 1. Audio or voice signals may be provided from one of the sources 20. A plurality of other sources produce data or other signals, of which a Data Source-1 and the Data/Signal source-N are illustrated, by way of example. The sources 22 and 24 may provide different serial bit streams of digital data. Modulators 32 and 34, indicated as Modulator-1, and Modulator-N, are provided for translating these signals into modulated tones which are adapted to be transmitted over the telephone line. For example, Modulator 1 can provide FSK modulated tones, while Modulator-N may provide PSK modulated tones. The source 20 and the outputs of the modulators 30 and 34 are connected to select and/or add circuits 36 which are operated by a controller 38. The controller also receives a squelch signal from the modulators 32 and 34 so as to inhibit the select circuits 36 from transmitting a voice signal from the source 20 when data signals are being transmitted. In the event that signals from the sources occupy different frequency bands or are otherwise compatible, they may be additively combined in the circuits 36 to output a composite signal for transmission.

Select circuits 40 are also operated by the controller to select the output from a demodulator which corresponds to the modulator which is selected by the circuits 36. Accordingly, corresponding signals may be transmitted and received simultaneously so as to obtain full duplex operation.

An amplifier 42 buffers and amplifies the signals from these circuits 36 to apply the transmitted signal to a duplexer 44 which is connected to the telephone line. The duplexer also provides a received signal. A portion of the transmitted signal which is reduced in amplitude accompanies the received signal. The duplexer may be an active circuit as will be described in greater detail in connection with FIG. 4. Other electromagnetic duplexers (hybrid coils and even bridge circuits) may be used. A decorrelator 46 receives the transmitted signal and the received signal from the duplexer. This decorrelator is preferably a correlation cancellation loop decorrelator, which is described in greater detail in connection with FIG. 2. It operates to cancel and remove the transmitted signal from the received signal to provide an output received signal which is substantially free of noise components due the transmitted signal. The correlation between the transmitted and received signals has been found, in accordance with the invention to be a basis upon which the transmitted signals can be removed, thereby leaving the received signals without interfering transmitted signals, and separating them without the need for frequency selective circuits. This is even though the transmitted and received signals are in overlapping portions of the band width (frequency band) of the telephone line. The disadvantages of frequency selective circuits are therefore obviated. It has been found in accordance with the invention that the decorrelator can be implemented utilizing available integrated circuits at low cost. The decorrelator is not sensitive to the mode of modulation of the signals and can handle FSK or PSK signals without modification. Even digital pulse signals can be decorrelated so as to remove the transmitted signal component thereof. The demodulators 28 and 30, translate the PSK or FSK modulation into digital outputs. The demodulator 28 is used when the received signal is FSK modulated. PSK signals are demodulated in the demodulator 30. The appropriate demodulator output is selected by the select circuits 40 to provide the output data. This output data may go to a computer or other utilization device.

When voice signals are transmitted, a telephone receiver or other audio circuits 48 are connected to the output of the duplexer. The telephone receiver will then obtain side tone as is conventional. When other signals are received, for example, other analog signals, a signal receiver 50 is desirably connected at the output of the decorrelator so as to obtain the output received signal without the transmitted signal. If audio or voice is received, the whine of a digital data stream is then removed. The signal receiver 50 may be part of an analog signal processor.

Figure 2:
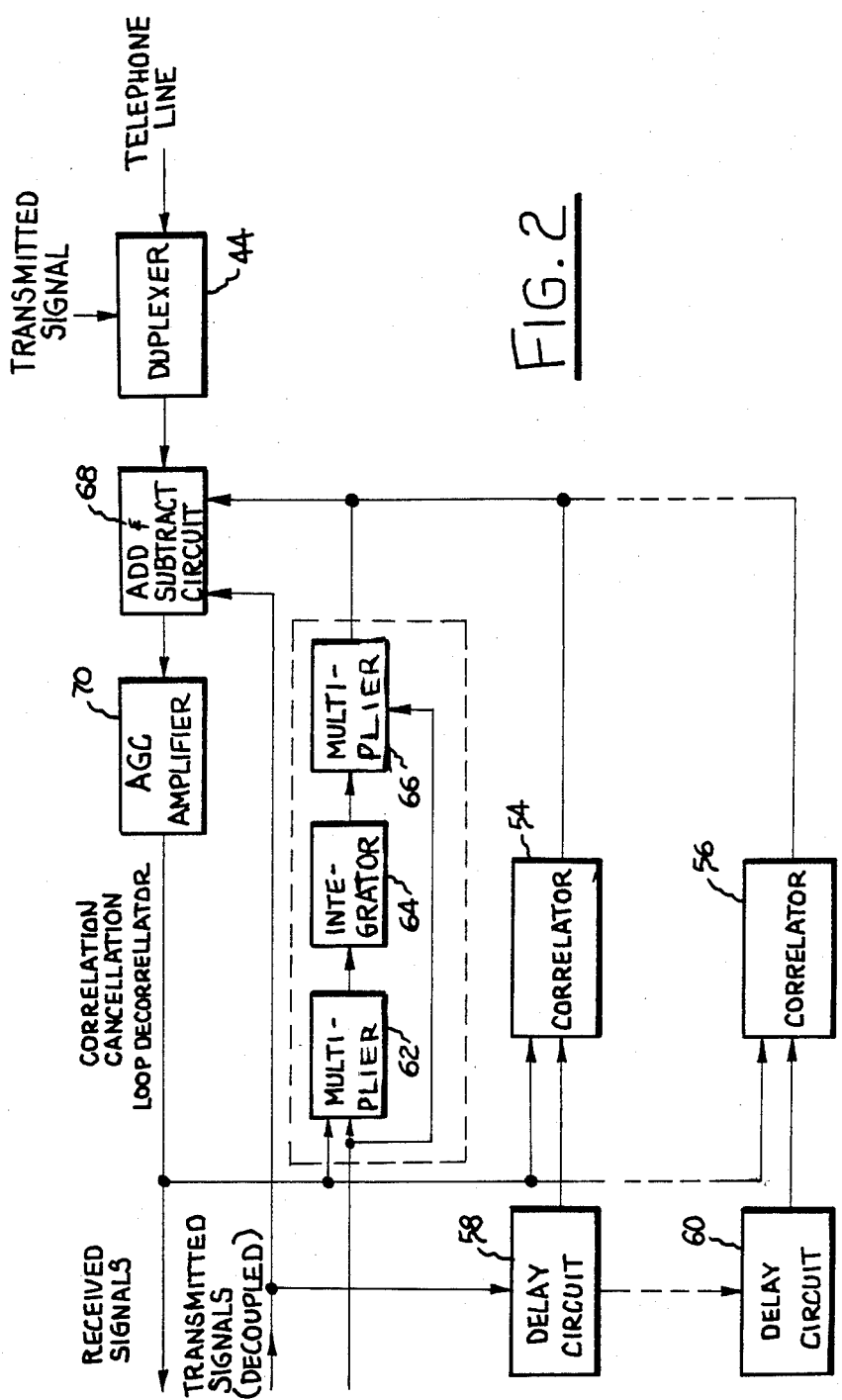
FIG. 2 is a more detailed block diagram of the decorrelator shown in FIG. 1.
Figure 4:
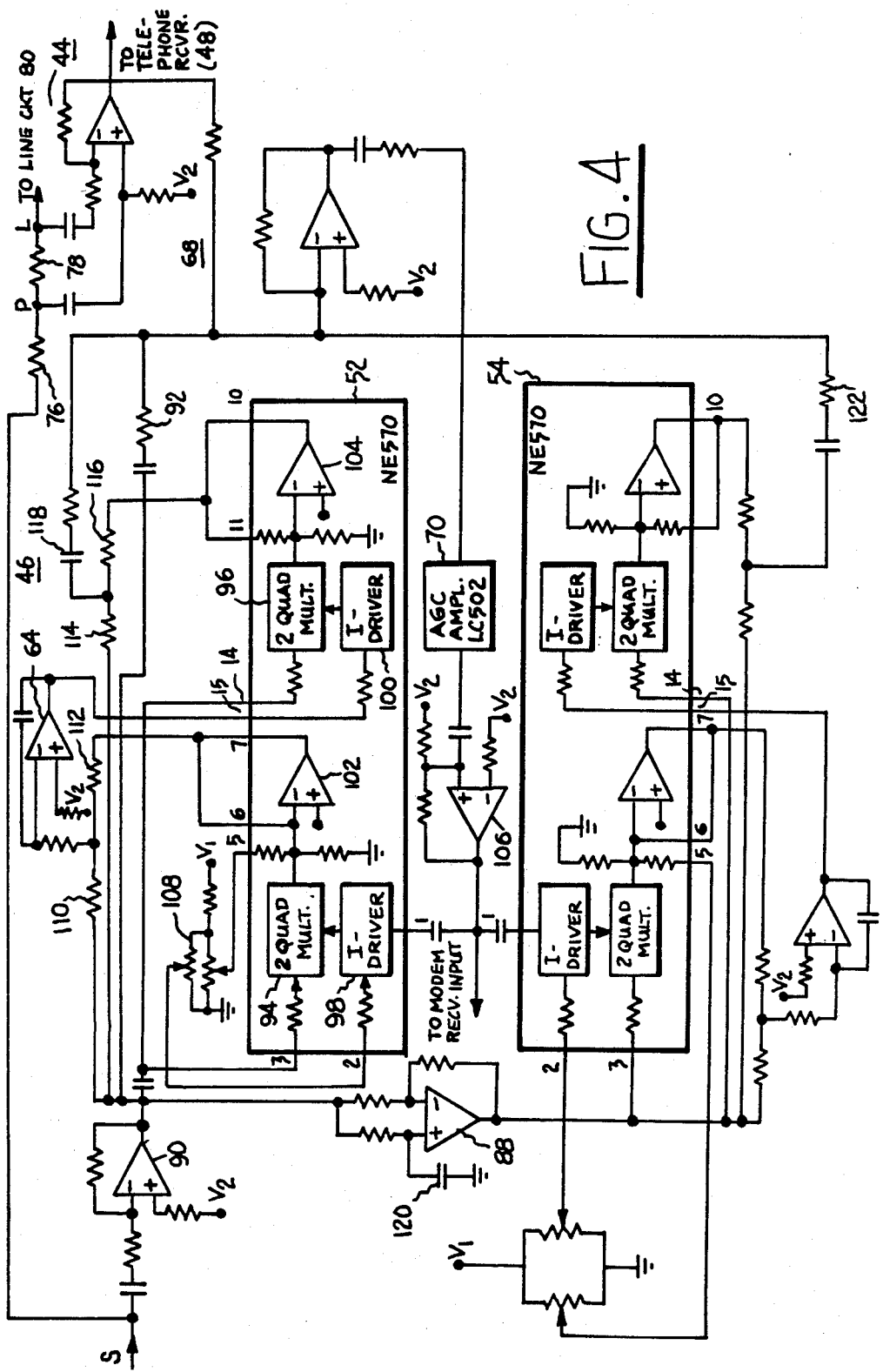
FIG. 4 is a schematic diagram showing the portions of the system illustrated in FIG. 3 which are connected between the modem and line circuit, in greater detail.

Referring to FIG. 2, there is shown the duplexer 44 to which the transmitted signal is applied and which is connected to the telephone line. A correlation cancellation loop (CCL) decorrelator 46 is connected to the output of the duplexer and also receives the transmitted signal AC coupled thereto. The decorrelator 46 contains a plurality of correlators, three of which 52, 54 and 56 are shown. The number of correlator stages to be used depends upon the amount of reduction of the transmitted signal components from the output received signal which is desired. The presently preferred embodiment of the invention, which is illustrated in FIG. 4, utilizes two correlator stages. The transmitted signal is AC coupled to the first correlator stage 52 and through successive delay circuits 58 and 60 to the subsequent correlator stages 54 and 56.

Each correlator stage includes a multiplier 62, an integrator 64 and another multiplier 66. The first multiplier multiplies the output received signal and the transmitted signal to produce an output signal corresponding to the product thereof having an average value which is proportional to the degree that the two input signals thereto are similar. This product output signal is integrated to remove extraneous fluctuations in level and to automatically adjust to provide for cancellation when multiplied with the transmitted signal in the second multiplier 66. The CCL also includes an adding and subtracting circuit 68 in which the correlator outputs subtract from the received signal from the duplexer 44.

In order to further facilitate the reduction in the transmitted signal, a portion thereof is applied to the circuit 68 and also subtracted from the duplexer output. To improve performance where the signals received from the telephone line are of relatively low amplitude as compared to the transmitted signal, a variable gain amplifier, preferably a AGC amplifier 70, is connected to complete the loop between the adding and subtracting circuit 68 and the inputs to the correlators 52, 54 and 56. The AGC amplifier 70 provides a substantially constant amplitude output. Since the transmitted signal is reduced in amplitude after the adding and subtracting circuit 68, and the received signal is a relatively higher proportion of the transmitted signal than existed at the output of the duplexer 44, the AGC amplifier effectively increases the relative amplitude of the received signal with respect to the transmitted signal and enhances the operation of the loop. The use of the AGC amplifier's constant amplitude output is especially suitable when the signals are FSK or PSK modulated. For further information respecting correlation cancellation loops, reference may be had to an article by D. R. Morgan and S. E. Craig, *Real-time Adaptive Linear Prediction Using the Least Mean Square Gradient Algorithm*, IEEE Transactions on Acoustics, Speech and Signal Processing, Vol. ASSP-24, No. 6, page 494, December, 1976. While this article discusses the theory of correlation cancellation loops and references other literature thereon, the application and advantages of such loops in communication systems to obtain the objects, features and advantages of this invention are not indicated.

Figure 3:
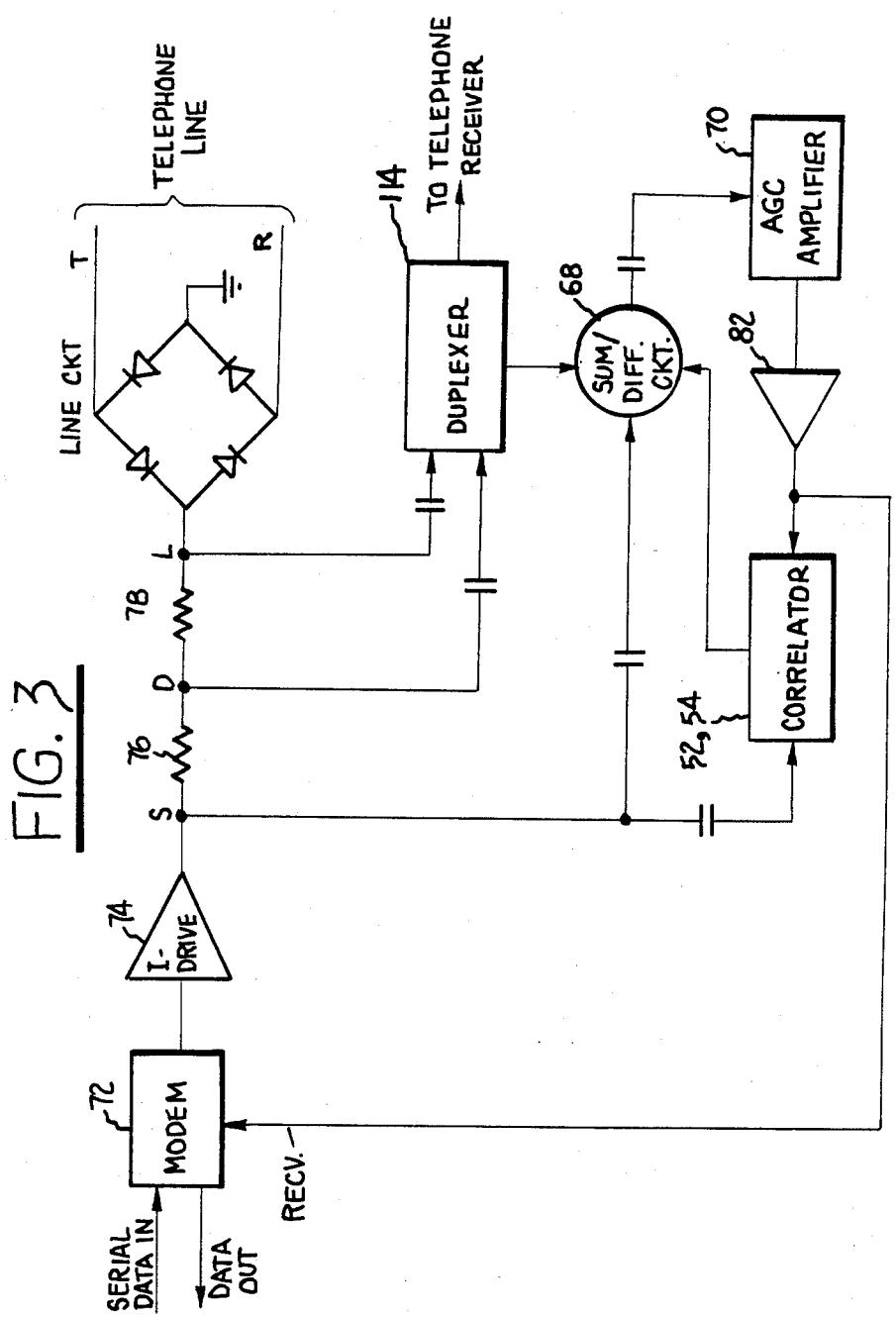
FIG. 3 is a more detailed block diagram illustrating the interconnection of a system embodying the invention with a telephone line.

Referring to FIG. 3, there is shown a typical communciations interface for serial data input and output which embodys the invention. The data is translated, for example, into FSK modulated signals in a modem 72. The modem also receives FSK modulated signals and translates them into serial data. The modem may be of the type which is conventionally available. Inasmuch as the system provided by the invention makes efficient use of the band width and enables the rate of transmission and reception (full duplex) to be increased, the modem is desirably of the type which operates at 1200 baud (bits per second) in either direction or 2400 baud duplex. An amplifier 74 in series with resistor 76 having an output impedance substantially matching that of the telephone line is coupled through a sensing resistor 78, of much lower resistance than the telephone line, to a line circuit 80 which may be a diode bridge to which are connected to the tip and ring (T&R) wires of the telephone line. The junctions of the resistors 76 and 78 with each other and with the amplifier 74 and the line circuit 80 are marked S (send), D (drive), and L (line). The line or received signals are capacitively coupled to the duplexer 44 from the L terminal; the transmitted signal is capacitively coupled to the duplexer from the D terminal; and the send or transmitted signals are capacitively coupled to the add and subtract circuit 68, which is called the Sum/Diff circuit in FIG. 3. The output of the Sum/Diff circuit 68 is capacitively coupled to the AGC amplifier 70 and amplified in an amplifier 82 to provide the output received signal which is used in the correlators 52, 54 . . . The received signal is also applied to the modem 72 where it is translated into a serial data output signal.

Referring next to FIG. 4, it will be noted that the S, D and L terminals between the line circuit 80 and the drive amplifier 74 are indicated. The duplexer 44 is an active, operational amplifier duplexer, the output of which is used both in the CCL decorrelator 46 and may be applied to the telephone receiver 48 (FIG. 1). The operating voltage sources are indicated as V1 and V2. When a unipolar power supply is used V2 may be one-half V1. The transmitted signal from the S terminal and the received signal from the output of the duplexer 44 are the principal inputs to the CCL decorrelator 46. The transmitted signals from the S terminal are capacitively coupled to an operational buffer amplifier 90 which supplies the transmitted signal to the decorrelators 52 and 54 and also by way of a capacitor and resistor 92 to the sum/diff circuit 68. The circuit 68 is an operational amplifier having a summing junction for the transmitted signal and the outputs from the correlators 52 and 54 at its inverting input. It will be noted that the transmitted signal from the D terminal is applied to the inverting input of the operational amplifier in the duplexer. Thus, the reduced amplitude component of the transmitted signal and the received signal will be combined with the outputs of the correlators 52 and 54 and the transmitted signal coupled through the capacitor and resistor 92 in opposite phase for subtraction in the sum/diff circuit 68.

The correlators 52 and 54 are implemented from an available integrated circuit. The type NE570, available from Signetics of Sunnyvale, Calif., or circuits similar thereto may be used. These NE570 integrated circuits each contain a pair of two quadrant multipliers 94 and 96, current drivers 98 and 100 and operational amplifiers 102 and 104. The pins of the integrated circuit, which connect to the inputs to these components which are utilized in the decorrelator 46, are indicated by their assigned reference numerals. Further information as to the NE570 may be obtained from the *Analog Data Manual* 1982, published by Signetics, page 15—15. The transmitted signal is multiplied in the first two quadrant multiplier 98 with the output received signal obtained from the sum/diff circuit 68 after passing through the AGC amplifier 70 and a buffer amplifier 106. The AGC amplifier may suitably be an integrated circuit type LC502 available from Linear Technologies Inc., P.O. Box 489, Station A, Burlington, Ontario L7R 3Y3, Canada and described in their Technical Data sheet no. 500-43. This amplifier or a variable gain amplifier provides a substantially constant output.

Inasmuch as the multiplier 94 is a two quadrant multiplier, the one of its inputs from the current driver 98 is offset in amplitude by an offset voltage obtained from a voltage divider arrangement 108. In order to remove this offset from the output of the multiplier, an offset voltage is combined with the product output of the multiplier at a summing junction input to the inverting terminal of the amplifier 102. Since the offset is multiplied by the transmitted signal, the transmitted signal is also removed by subtracting a portion of the transmitted signal from the inverted product obtained from the amplifier 102 at a summing junction of two resistors 110 and 112.

The integrator 64 is provided by an operational amplifier circuit and applies the integrated product to the second current driver 100 so as to obtain the proper offset for multiplying in the second two-quadrant multiplier 96 with the transmitted signal which is capacitively coupled from the output of the buffer amplifier 90. The amplifier 104 and a summing circuit provided by two resistors 114 and 116 removes the offset and the product of the offset and the transmitted signal from the output which is coupled to the summing junction of the sum/diff. circuit 68 through a capacitor and resistor 116.

The delay circuit 58 is implemented by an operational amplifier with a capacitor 120 connected to its direct input. The delay transmitted signal is capacitively coupled to the correlator 54. The correlator 54 and the circuits connected thereto are identical to the correlator 52 and the circuits connected thereto so that no further description thereof is necessary. The output of the second correlator 54 is coupled via a capacitor and resistor 122 to the summing junction of the sum/diff circuit 68. It will therefore be seen that the CCL decorrelator may be implemented at low cost from available integrated circuits to provide a communications interface which obtains the features and advantages of the invention.

From the foregoing description it will be apparent that there has been provided a communication system which is capable of providing for high rate transmission and reception of signals, particularly digital data, over communications links, such as telephone lines. While a preferred embodiment, in a communications interface for use with a telephone line has been presented and the circuits from which the invention may be implemented described in detail, it will be appreciated that variations and modifications thereof within the scope of the inven-

I claim:

1. A communication system for simultaneous transmission and reception of information representing signals on a communications link which comprises means connected to said link for separating signals received from said link from signals being transmitted on said link to provide received signals containing said transmitted signals, means for decorrelating said received signals with said transmitted signals, including means for correlating said received signals with said transmitting signals to provide a correlation output, and means for directly and without filtering, subtracting said correlation output from said received signals, for deriving output received signals substantially free of interference from said transmitted signals from which said information represented by said received signals can be derived.

2. The communication system according to claim 1 wherein said decorrelating means comprises means for amplifying said output received signals and decorrelating said amplified output received signals with said transmitted signals.

3. The communcations system according to claim 2 wherein said amplifying means is an AGC amplifier for maintaining the amplitude of said output received signals substantially constant.

4. The communication system according to claim 1 wherein said decorrelating means comprises a correlation cancellation loop (CCL).

5. The communication system according to claim 4 wherein said CCL comprises a correlator having first multiplier means in which said output received signals and said transmitted signals are multiplied and from which an output corresponding to the product thereof is provided, an integrator in which said product is integrated, and a second multiplier in which said transmitted signals and said integrated product are multiplied to provide an output, and means for subtracting said output from said second multiplier from said received signals to provide said output received signals.

6. The communication system according to claim 5 wherein said subtracting means is also operative to subtract a predetermined proportion of said transmitted signals from said received signals.

7. The communication system according to claim 6 wherein said CCL further comprises at least one additional correlator having a second first multiplier, a second integrator and a second second multiplier, means for delaying said transmitted signals to provide delayed transmitted signals which are multiplied with said output received signals in said second first multiplier to provide the product thereof, which is integrated in said integrator to provide the integral thereof which is multiplied with said delayed transmitted signal in said second second multiplier to provide an output, and means for applying said output of said second second multiplier to said subtracting means for subtraction from said received signal therein.

8. The communication system according to claim 6 further comprising means for amplifying the output of said subtracting means to provide said output received signals.

9. The communication system according to claim 8 wherein said amplifying means is an AGC amplifier providing said output received signals with substantially constant amplitude.

10. The communication system according to claim 1 wherein said link is a telephone line and said information is in the form of data signals, and further comprising simultaneously operative modulator and demodulator means for respectively translating data signals into said transmitted signals and translating said output received signals into output data signals.

11. The communication system according to claim 10 wherein said modulator and demodulator means is provided by modem means for respectively translating digital pulse signals into AC signals which vary in frequency or phase to provide said transmitted signals and for translating said output received signals from AC signals which vary in frequency or phase into digital pulse signals.

12. The communication system according to claim 10 further comprising means for applying analog signals (audio or voice) to said telephone line in combination with said data representing transmitted signals, and said receiver means being connected to said decorrelating means for deriving analog signals received from said line.

13. The communication system according to claim 12 further comprising a plurality of sources each of a different signal to be transmitted, a plurality of modulator means each modulating a different one of said signals to be transmitted to provide signals for transmission over said line corresponding thereto, a plurality of demodulator means each corresponding to a different one of said modulator means, and means for selectively connecting said modulator means to said line through said separating means to output the signals therefrom selectively onto said line as the transmitted signals and for selectively applying the said output received signals to the demodulator means corresponding thereto.

14. A communications system for simultaneous transmission and reception of information representing signals on a communications link which comprises means connected to said link for separating signals received from said link from signals being transmitted on said link to provide received signals containing said transmitted signals, means for decorrelating said received signals with said transmitted signals for deriving output received signals substantially free of interference from said transmitted signals from which said information represented by said received signals can be derived, which comprises a correlation cancellation loop (CCL), said CCL comprising a correlator having first miltiplier means in which said output received signals and said transmitted signals are multiplied and from which an output corresponding to the product thereof is provided, an integrator in which said product is integrated, and a second multiplier in which said transmitted signals and said integrated product are multiplied to provide an output, means for subtracting said output from said second multiplier from said received signals to provide said output received signals, said subtracting means also being operative to subtract a predetermined portion of said transmitted signals from said received signals, said first and second multipliers being two quadrant multipliers each of which provides product outputs, and further comprising means for offsetting the output received signals in amplitude to provide the output received signals' input to said first multiplier, and means for subtracting from, said product output from said first multiplier, said transmitted signals.

15. The communication system according to claim 14 further comprising AGC amplifier means for amplifying said received signals and maintaining the amplitude thereof substantially constant, and said amplified received signals being applied to said first multiplier.

16. The communication system according to claim 14 including means for offsetting the said integrated product from said integrator to provide an input to said second multiplier, and means for subtracting said transmitted signals from said output from said second multiplier to provide said second multiplier output.

17. The communication system according to claim 16 wherein said CCL further comprises at least one additional correlator having a second first multiplier, a second integrator and a second second multiplier, means for delaying said transmitted signals to provide delay transmitted signals which are multiplied with said output received signals in said second first multiplier to provide the product thereof which is integrated in said integrator to provide the integral thereof which is multiplied with said delay transmitted signal in said second second multiplier to provide an output, means for applying said output of said second second multiplier to said subtracting means for subtraction from said received signal therein, and wherein said second first and second second multipliers are two quadrant multipliers and further comprising means for offsetting said output received signals in amplitude to provide the output received signals' input to said first multiplier and said second first multiplier and means for subtracting from said product from said first multiplier and second first multiplier said transmitted signal.

18. The communication system according to claim 16 wherein said first and second multipliers and said offsetting means are provided by a circuit of the NE570 integrated circuit type.

19. The communications system according to claim 17 wherein said first named correlator and said additional correlator each comprise circuits of the NE570 integrated circuit type.

* * * * *